US007836456B1

(12) United States Patent
Violleau et al.

(10) Patent No.: US 7,836,456 B1
(45) Date of Patent: Nov. 16, 2010

(54) SEAMLESS EXTENSION OF SHAREABLE INTERFACE MECHANISM TO SERVLET AND EXTENDED APPLET MODEL FOR INTER-APPLICATION COMMUNICATION

(75) Inventors: Thierry P. Violleau, Poissy (FR); Tanjore Ravishankar, San Jose, CA (US); Matthew R. Hill, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1049 days.

(21) Appl. No.: 11/590,953

(22) Filed: Oct. 31, 2006

(51) Int. Cl.
*G06F 9/54* (2006.01)
(52) U.S. Cl. .................. 719/315; 719/313; 713/150; 717/150
(58) Field of Classification Search .................. 719/315
See application file for complete search history.

(56) References Cited

U.S. PATENT DOCUMENTS

| 7,127,605 | B1 * | 10/2006 | Montgomery et al. ....... 713/150 |
| 2002/0174224 | A1 | 11/2002 | Scheifler et al. |
| 2004/0019893 | A1 * | 1/2004 | Hepworth et al. ........... 719/310 |
| 2004/0088562 | A1 | 5/2004 | Vassilev et al. |
| 2004/0216150 | A1 | 10/2004 | Scheifler et al. |
| 2006/0085421 | A1 * | 4/2006 | Backhouse et al. ............ 707/10 |

FOREIGN PATENT DOCUMENTS

EP 1 431 862 A2 6/2004

WO WO 2005/045735 A1 5/2005

OTHER PUBLICATIONS

European Patent Office, "Communication pursuant to Article 94(3) EPC", Application No. 06256576.7-2212, dated Jul. 17, 2008, 4 pages.
Claims, Application No. 06256576.7-2212, 3 pages.
European Patent Office, "Communication pursuant to Article 94(3) EPC", Application No. 07250044-2212, dated Jul. 3, 2008, 1 page.
Claims, Application No. 07250044-2212, 3 pages.
Gong, L. et al., "Implementing Protection Domains in the Java™ Development Kit 1.2", Proceedings of the Internet Society Symposium on Network and Distributed System Security, XP-002304112, Mar. 1988, 10 pages.

(Continued)

*Primary Examiner*—Hyung S Sough
*Assistant Examiner*—Syed Roni
(74) *Attorney, Agent, or Firm*—Osha• Liang LLP (57) ABSTRACT

In a smart card system in which applications executing in different execution contexts are allowed to communicate with each other only through shareable interface objects (SIO's), a registry mechanism is provided to mediate in inter-application communication between legacy applets, extended applets and servlets. A request by a client application for a SIO of a server application in a different execution context is routed to the registry mechanism by the system. Dependent on what types the client and server applications are, the registry mechanism provides call interfaces as would be expected by the applications to enable passing the SIO from the server application to the client application. In one embodiment, servlets and extended applets may also register and unregister their SIOs dynamically with the registration mechanism.

16 Claims, 5 Drawing Sheets

OTHER PUBLICATIONS

Gong, L. et al., "Going Beyond the Sandbox: An Overview of the New Security Architecture in the Java™ Development Kit 1.2", Proceedings of the Usenix Symposium on Internet Technologies and Systems, XP-002250254, Dec. 1997, 10 pages.

Gong, L. et al., "Java Security Architecture (JDK 1.2)", Internet Citation, XP-002171445, dated Dec. 6, 1998, 62 pages.

European Patent Office, "European Search Report", European application No. 07250044.0-2212, 10 pages.

Claims, European application No. 07250044.0-2212, 5 pages.

European Patent Office, "European Search Report", European application No. 06256576.7-221, 11 pages.

Claims, European application No. 06256576.7-2212, 5 pages.

Nagaratnam, Nataraj et al., "Practical delegation for secure distributed object environments", Distributed Systems Engineering, Institute of Physics Publishing, Bristol, Great Britain, vol. 5, No. 4, XP-020073372, Dec. 1, 1998, 12 pages.

Wangham, Michelles et al., "Security Mechanisms for Mobile Agent Platforms Based on SPKI/SDSI Chains of Trust", Software Engineering for Multi-Agent Systems II Lecture Notes in Computer Science, Springer-Verlag, Berlin, vol. 2940, XP-019003515, 2004, 18 pages.

Molva, Refik et al., "A Distributed Access Control Model for Java", Computer Security, Esorics 2000 Lecture, Notes in Computer Science, Springer-Verlag, 2000, Heidelberg, Berlin, XP-019049349, vol. 1895, 18 pages.

* cited by examiner

SEAMLESS EXTENSION OF SHAREABLE INTERFACE MECHANISM TO SERVLET AND EXTENDED APPLET MODEL FOR INTER-APPLICATION COMMUNICATION

This application is related to U.S. patent application Ser. No. 11/507,872, entitled "METHOD AND APPARATUS FOR PROTECTION DOMAIN BASED SECURITY", filed by THIERRY VIOLLEAU et al. on Aug. 21, 2006, the entire contents of which is hereby incorporated by reference for all purposes as if fully set forth herein.

This application is related to U.S. patent application Ser. No. 11/511,948 entitled "METHOD AND APPARATUS FOR DATA TRANSFER BETWEEN ISOLATED EXECUTION CONTEXTS", filed by THIERRY VIOLLEAU et al. on Aug. 28, 2006, the entire contents of which is hereby incorporated by reference for all purposes as if fully set forth herein.

BACKGROUND

Smart cards are wallet-size or smaller devices with embedded integrated circuits. A smart card typically comprises a processor and memory. Smart cards come with various tamper-resistant properties and are capable of storing vital information and hosting sensitive applications in a secure manner. Smart cards implementing Java Card technology further enhance application security by executing applications in different firewalls, or execution contexts. Under this enhanced security scheme, data, methods and/or objects inside a server application can only be accessed through shareable interface objects (SIO's) by a client application executing in a different execution context.

In order to obtain a SIO from a server application, a client application uses a multi-step procedure. First, the client application is required to have specific knowledge of an application identifier for the SIO and prepare a binary representation of that application identifier. Second, the client application is required to invoke a first system call "JCSystem.lookupAID( )" with the binary representation prepared. Third, the system returns a corresponding application identifier object to the client application if the application identifier is determined as genuine. Fourth, the client application is required to invoke a second system call "JCSystem.getAppletShareableInterfaceObject( )" and pass the returned application identifier object in the call. Fifth, the system in turn invokes a method supplied by the server application, "Applet.getShareableInterfaceObject( )" to obtain the SIO. The server application may implement logic in the aforementioned method to either allow or deny access to the SIO by the client application. If the access is allowed, the SIO is passed from the server application to the client application via the system.

One disadvantage of these techniques is that a client application is forced to have specific knowledge of an application identifier for a SIO in a server application. This specific knowledge must be hard-coded in the client application at development time. Thus, if the hard-coded application identifier does not correctly match with an intended SIO, the client application is likely to face serious problems in its execution at runtime.

Another disadvantage of these techniques is that they cannot easily accommodate web applications such as servlets that provide web-based service, or access, to data, methods and/or objects in the web applications. A web-based service can be identified by a Unified Resource Identifier (URI), which is of variable lengths from several bytes to more than several hundred bytes. An application identifier, on the other hand, has a fixed length of sixteen bytes comprising five bytes that identifies a specific vendor and eleven bytes that the vendor can use for its own purpose. Since a URI is frequently much longer than sixteen bytes, the URI cannot simply be accommodated using an application identifier scheme. Thus, web-based services cannot be exposed to client applications in different execution contexts through SIOs that are identified only by application identifiers under the legacy operating model.

Because of these limitations, the existing techniques are not as useful in enabling an application executing in one execution context in a smart card system to access data, methods and objects of another application executing in a different execution context through a shareable interface object, as would be desired. As a result, an improved mechanism which would enable such access between applications is needed.

SUMMARY

In a smart card system in which applications executing in different execution contexts are allowed to communicate with each other only through SIO's, applications on Java Cards can be classified into three types. The first type of applications is a legacy applet operating in accordance with the legacy operating model. An application of this type only understands the aforementioned multi-step procedure. As a client who asks for a SIO, a legacy applet makes two system calls. As a server who provides a SIO, a legacy applet implements a method for the system to call and logic to deny or give the SIO. Next, the second type of applications is an extended applet, which may operate in accordance with either the legacy operating model or a new operating model. The new operating model allows a SIO to be identified by either an application identifier or a URI. Thus, a SIO exposed by an extended applet may be identified by an application identifier (in a SIO registry). Finally, the third type of applications is a web application such as a servlet, operating in accordance with the new operating model. Under the new operating model, a SIO exposed by a servlet may be identified by a URI (in a SIO registry).

The first and second types can serve both as a client and as a server to each other because they all understand how to access and be accessed through a SIO identified by an application identifier. The second and third types can serve both as a client and as a server to each other because they, operating in a new operating model, all understand how to access and be accessed through a SIO identified by either an application identifier or a URI. In addition, an application of the third type can access, as a client, an application of the first type as a server because the application of the third type understands how to access a SIO identified by an application identifier, even though the reverse is not true, i.e., the application of the first type does not know how to access, as a client, the application of the third type as a server.

In accordance with one embodiment of the present invention, there is provided a registry mechanism which mediates inter-application communication between all three types of applications in different execution contexts through SIOs. A request by a client application for a SIO of a server application in a different execution context is routed to the registry mechanism by the system. The registry mechanism handles the request in a manner that is dependent on what types the client and server applications are. For example, if the registry mechanism determines that the client application is a legacy applet, which understands only the multi-step procedure, then the mechanism will provide the same system call interface as would be expected by legacy applet clients. However, if the registry mechanism determines that the client application is a servlet or extended applet, which supports the new operating model, the registry mechanism causes a SIO to be created and returns the SIO to the client application (servlet or extended applet) in a single call. Furthermore, if the registry mechanism determines that the server application is a legacy applet, which implements a method for the system to call and logic to deny or give a SIO, then the mechanism will make use of that method to obtain the SIO. If the registry mechanism determines that the server application is a servlet or extended applet, the mechanism will locate a factory object and, invoke the factory object to cause a SIO to be created.

Suppose that a client application which asks for a SIO is a legacy applet and a server application which exposes the SIO is an extended applet. As previously discussed, the system will provide the same call interface for the legacy applet to make the request for the SIO. Internally however, instead of calling a method as would be supplied by a server application operating in the legacy operating model, the registry mechanism will invoke an associated factory object to create the SIO.

Now, suppose that the client application is a servlet or extended applet and the server application is a legacy applet. As previously discussed, the system will provide the one-call interface for the servlet or extended applet to make the request for and obtain the SIO. Internally, however, the registry mechanism will invoke a method supplied by the legacy applet, instead of using a factory object.

As the above discussion shows, a client extended applet may use the one-call interface in the new operating model to request for SIOs in a legacy applet. Furthermore, being an applet itself, a client extended applet may also use the legacy multi-step procedure to request for SIOs in a legacy applet or another extended applet, if the client extended applet so chooses.

To determine a type of client or server application, the registry mechanism maintains a plurality of entries in a SIO lookup registry for all SIOs that server applications on a card wish to expose. In one embodiment, servlets and extended applets may register or unregister their SIOs dynamically with the registration mechanism. Upon receiving a registration request from an application, the registration mechanism stores into the SIO lookup registry an entry associated with the SIO. Upon receiving an un-registration request, the registration mechanism looks in the SIO lookup registry for an entry associated with a SIO identified in the request and removes the entry from the SIO lookup registry.

These and other aspects of the present invention will be discussed in greater detail in the following sections.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

System Overview

Figure 1:
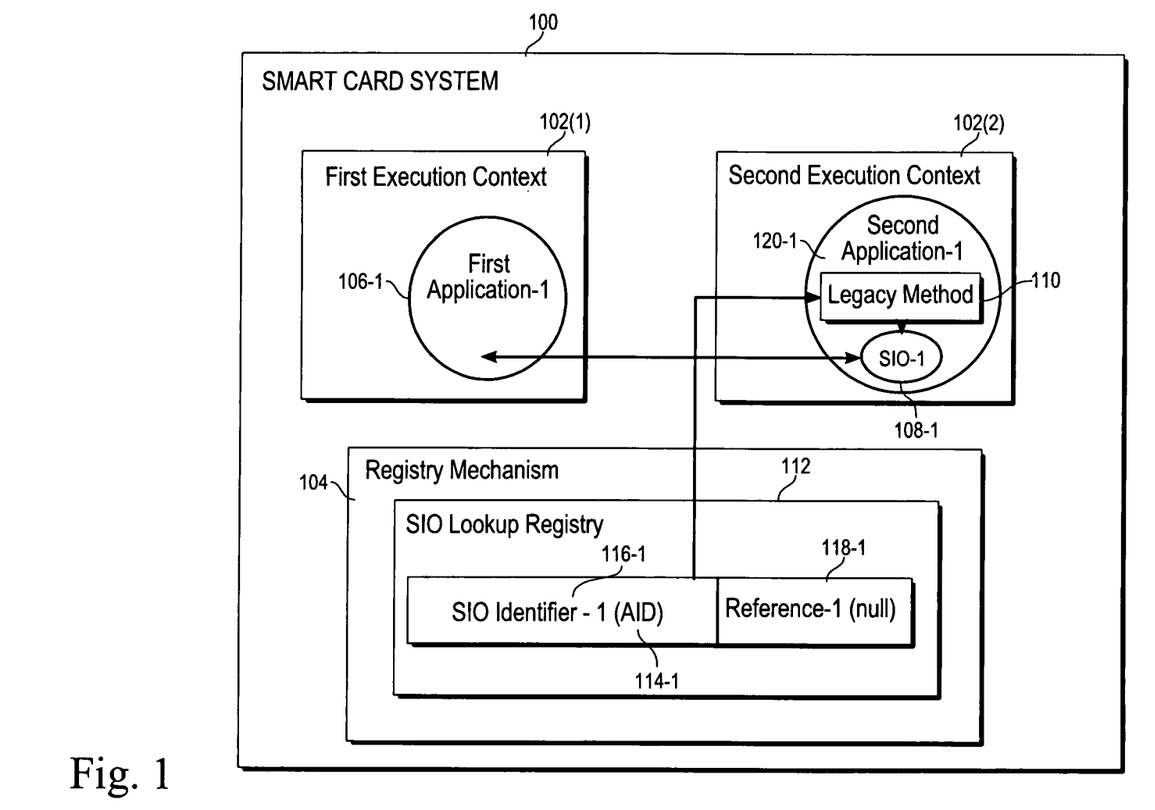
FIG. 1 is a diagram illustrating entities involved in inter-application communication across execution contexts, in accordance with an embodiment of the present invention.
Figure 2:
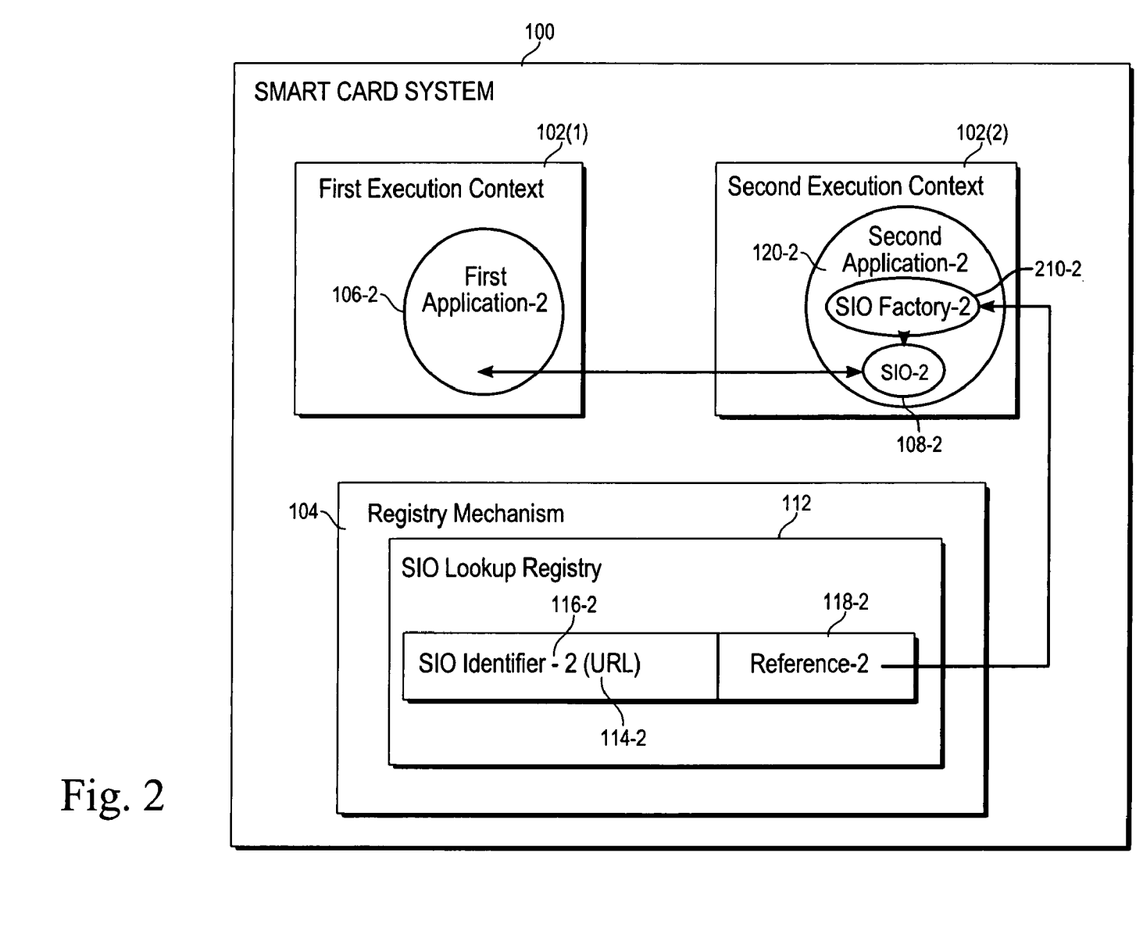
FIG. 2 is a diagram illustrating entities involved in inter-application communication across execution contexts, in accordance with another embodiment of the present invention.
Figure 3:
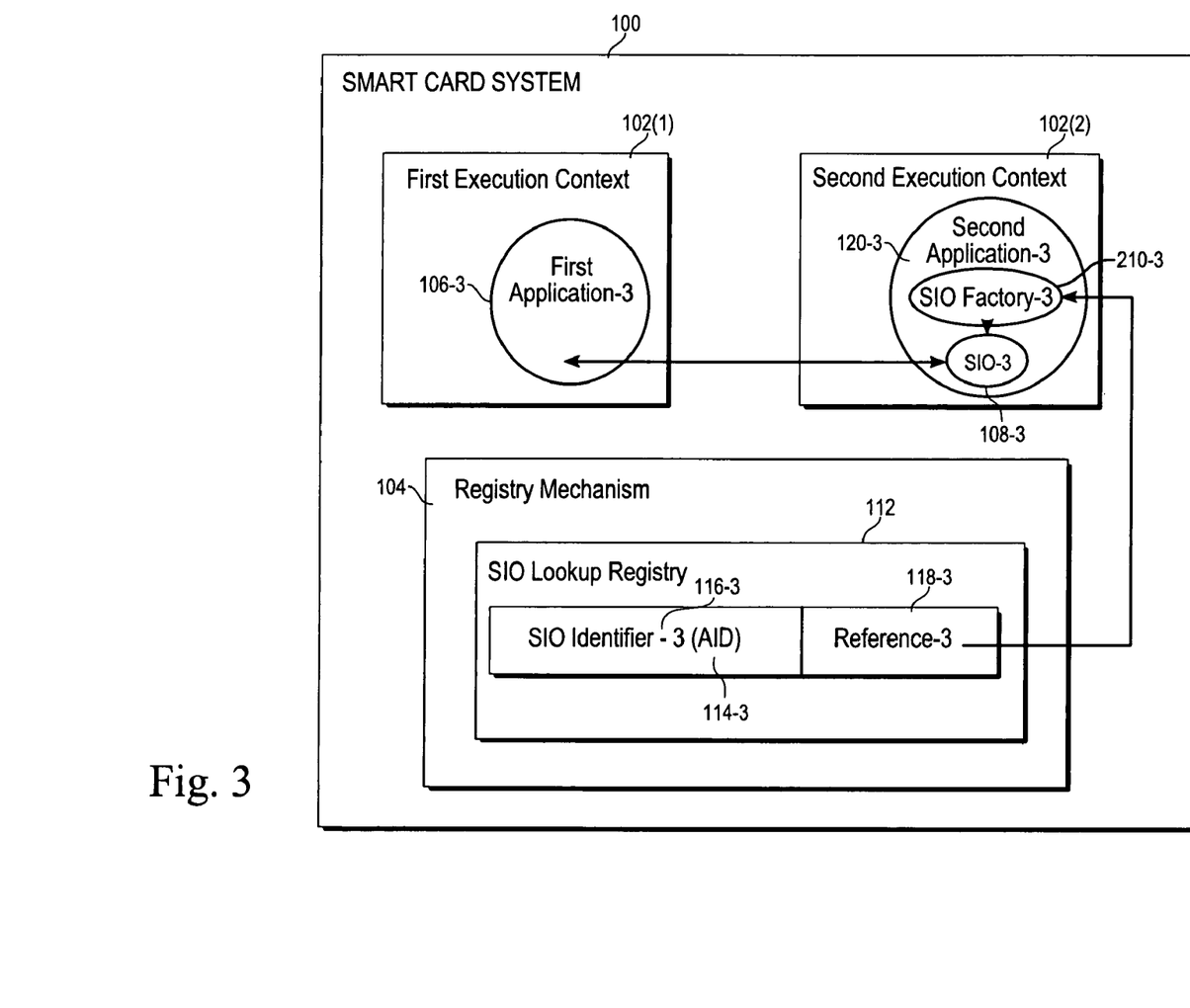
FIG. 3 is a diagram illustrating entities involved in inter-application communication across execution contexts, in accordance with yet another embodiment of the present invention.

FIGS. 1-3 are diagrams illustrating entities involved in inter-application communication across execution contexts, in accordance with various embodiments of the present invention. As shown, smart card system 100 comprises one or more execution contexts 102 and a registry mechanism 104. For purposes of the present invention, the smart card system 100 may be any type of smart card, including but not limited to, a smart card implementing the Java Card technology. The smart card system 100 provides a framework in which applications are executing in execution contexts and inter-application communication across execution contexts is enabled through shareable interface objects (SIO's). A shareable interface object (SIO) as referenced herein is an object which has been designated by the owning server application as accessible from a client application context. Only the methods defined in the Shareable Interface (SI) are accessible to the client.

For purposes of illustration, only two execution contexts, a first execution context 102(1) and a second execution context 102(2), are shown. It should be noted that smart card system 100 can accommodate any number of execution contexts. In one embodiment, each execution context 102 may host one or more applications and each application carries a unique number that is associated with the execution context. For example, applications in the first execution context 102(1) are assigned a first unique number associated with the first execution context 102(1), and applications in the second execution context 102(2) are assigned a second unique number associated with the second execution context 102(2), and so on. System 100 can detect a request by a client application to a server application as being one that crosses execution context boundary by comparing unique numbers that are carried by the client and server applications identifying different execution contexts in which each executes. For example, when a first application 106 in the first execution context 102(1) makes a request for a SIO of a second application 120 in the second execution context 102(2), System 100 can detect the request as being one that crosses different execution contexts because a first unique number the first application 106 carries identifies the execution context 102(1) and a second unique number the second application 120 carries identifies the execution context 102(2).

The registry mechanism 104 comprises a SIO lookup registry 112. The SIO lookup registry 112 may be implemented as a table in runtime memory accessible to the registry mechanism which table comprises a plurality of entries 114. Each entry 114 corresponds to a SIO such as the SIO 108-1 and comprises a SIO identifier 116 and a reference 118. The SIO identifier 116 uniquely identifies the corresponding SIO. Applicable forms of identifiers include URIs and AIDs. A URI would identify a SIO exposed by a servlet while an AID would identify a SIO exposed by either a legacy or extended applet. In particular, the URI would be relative to a base universal resource identifier (URI) enabling the particular application to be accessed as a web application, and would identify a shareable interface object in a particular application. For a SIO exposed by servlets and extended applets, a reference 118 in a corresponding entry 114 would point to a SIO factory object, as will be explained in detail later, which could be invoked to create the SIO requested. For a SIO exposed by legacy applets, a reference 118 in a corresponding registry entry 114 is null.

Legacy Applet as Server Application

As shown in FIG. 1, a first application 106-1 executes in the first execution context 102(1) and a second application 120-1 executes in the second execution context 102(2). In this example, the second application 120-1 is a legacy applet (which may also be an extended applet operating under the legacy model) while the first application 106-1 can be any type of application. Suppose that the first application 106-1 wishes to communicate with the second application 120-1. This inter-application communication across execution contexts is conducted through SIOs. For example, the first application 106-1 that is interested in some data, methods and/or objects in the second application 120-1 may be required to access them through a SIO 108-1. As a legacy applet, the second application 120-1 provides a legacy method 110 that can be invoked by the system to obtain the SIO 108.

In the present example, SIO-1 108-1 is exposed by a legacy applet, i.e., second application 116-1. Thus, SIO identifier 116-1 is in an AID form and reference 118-1 is null.

Servlet as Server Application

As shown in FIG. 2, a first application 106-2 executes in the first execution context 102(1) and a second application 120-2 executes in the second execution context 102(2). In this example, the second application 120-2 is a servlet while first application 106-2 can be either a servlet or an extended applet. Suppose that the first application 106-2 wishes to communicate with second application 120-2. This inter-application communication across execution contexts is conducted through SIOs. For example, first application 106-2 that is interested in data, methods and/or objects in the second application 120-2 may acquire them through a SIO 108-2. As a servlet operating in the new operating model, the second application 120-2 provides a SIO factory-2 210-2 that can be invoked by the registry mechanism to create the SIO 108-2.

In the present example, SIO-2 108-2 is exposed by a servlet, i.e., second application 116-2. Thus, SIO identifier 116-2 is in a URI form and reference 118-2 points to a SIO factory object, i.e., SIO factory-2 210-2, which could be invoked to create SIO-2 108-2.

Extended Applet as Server Application

As shown in FIG. 3, a first application 106-3 executes in the first execution context 102(1) and a second application 116-3 executes in the second execution context 102(2). In this example, the second application 120-3 is an extended applet which happens to be under the new operating model while the first application 106-3 can be any type of application. Suppose that the first application 106-3 wishes to communicate with second application 120-3. This inter-application communication across execution contexts is conducted through SIOs. For example, the first application 106-3 that is interested in data, methods and/or objects in the second application 120-3 may acquire them through a SIO 108-3. As an extended applet operating in the new operating model, the second application 120-3 provides a SIO factory-3 210-3 that can be invoked by the registry mechanism to create the SIO 108-3.

In the present example, SIO-3 108-3 is exposed by an extended applet, i.e., the second application 116-3. Thus, SIO identifier 116-3 is in an AID form and reference 118-3 points to a SIO factory object, i.e., SIO factory-3 210-3, which could be invoked to create SIO-3 108-3.

Operational Overview

Requesting SIOs through the Registry Mechanism

On a given smart card, multiple applications may run concurrently, each implementing a particular set of services. For example, one application may implement a set of services that relates to credit card operations; another application may implement a set of services that relates to storing cash value on the smart card; and still another may implement a set of services that relates to grocery shopping at a particular vendor. A transaction using the smart card may invoke services from all three applications.

To complicate the matter, applications on the smart card may be deployed at different times and operate in accordance with their respective operating model, thereby resulting in all types of applications executing on the same card. In the present example, the stored cash application may operate in accordance with the legacy operating model while the credit card and grocery shopping applications operate in accordance with the new operating model. Furthermore, the credit card application may even be accessible by entities outside the smart card from the internet.

As will now be explained, by handling each client or server application in a way that the application expects it to be handled and mediating between dissimilar operating models to maximize interoperability, the registry mechanism ensures that all types of applications can securely and seamlessly access each other's services in terms of data, methods and/or objects as exposed through shareable interface objects.

Figure 4:
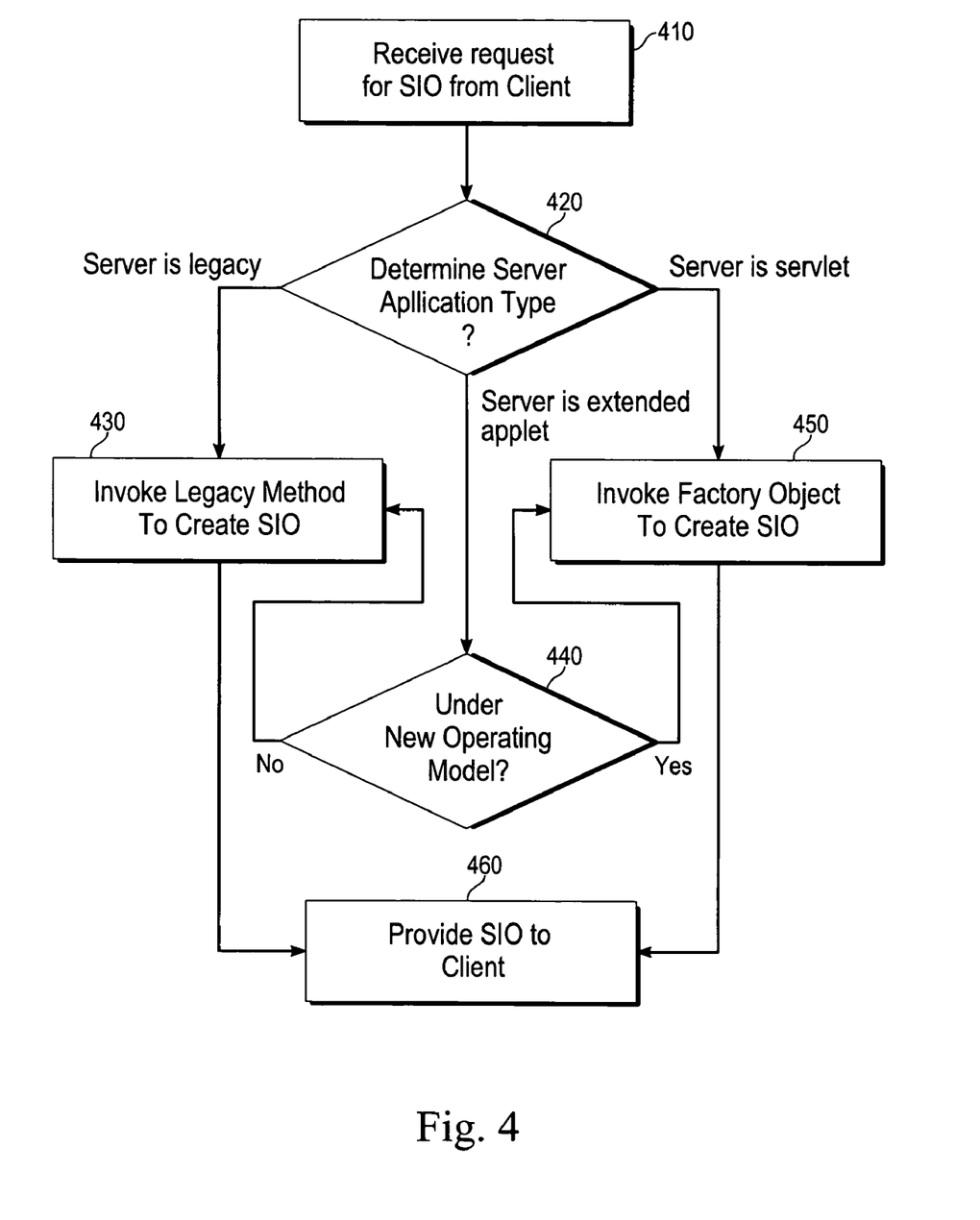
FIG. 4 is a flow diagram which provides a high level overview of operation involving a registry mechanism.

A flow diagram which provides a high level overview of operation involving the registry mechanism is shown in FIG. 4. Additional references to FIGS. 1-3 will be made in the discussion herein.

When a first application 106 on a smart card wishes to communicate with a second application 120 executing in a different execution context on the same card, the first application 106 can send a request for a SIO 108 exposed by the second application 120 to the registry mechanism 104. The request would comprise a set of identification information for the SIO requested and zero or more parameters. If the first application 106 is a servlet or extended applet, the request can be made by invoking a method directly provided by the registration mechanism, "JCRegistry.lookup( )", in an embodiment. If the first application 106 is a legacy applet, it can follow the multi-step procedure in the legacy operating model by calling JCSystem.lookupAID( ) to obtain an AID object and then, based on the returned AID object, calling JCSystem.getAppletShareableInterfaceObject( ) to obtain an interested SIO. On a smart card with present invention implemented, these two calls would be routed to the registry mechanism 104 by the system 100. Thus, whether the first application is a legacy applet operating in the legacy operating model or a servlet or extended applet operating in the new operating model, the registry mechanism 104 receives the request for the SIO 108 (step 410 of FIG. 4).

Upon receiving the request, the registry mechanism 104 determines whether the second application 120 operates in accordance with the legacy operating model or the new operating model (step 420 of FIG. 4). In one embodiment, this determination can be made by accessing the SIO lookup registry 112, finding an entry 114 in the SIO registry that matches the set of identification information received in the request from the first application 106, and determining whether a reference 116 in the matching entry is null. If the reference 116 in the entry 114 is null, the second application 120 is determined as a legacy applet (as 120-1 shown in FIG. 1) operating in the legacy operating model. In this case, the registry mechanism invokes a legacy method 110 such as "Applet.getShareableInterfaceObject( )" to obtain the SIO (step 430 of FIG. 4). On the other hand, if the reference 118 in the matching entry 114 points to a SIO factory object 210, the second application is determined to be either a servlet (120-2 in FIG. 2) or an extended applet (120-3 in FIG. 3). A further determination may be made as to whether the second application is a servlet or an extended applet. For example, in a particular embodiment, the registration mechanism 104 may determine whether a qualifier such as "uri" or "aid" in a corresponding SIO identifier 116 of the matching entry 114. If the qualifier is "uri", then the second application is determined to be a servlet. Otherwise, if the qualifier is "aid", then the second application is determined to be an extended applet. If the second application is determined to be an extended applet, then the registration may determine whether the extended applet is operating in the legacy model or operating in the new operating model. In one embodiment, the registration mechanism may invoke a system call or a call provided by the second application to determine whether the second application is operating under the legacy model or not (step 440 of FIG. 4). In one embodiment, the registration mechanism defaults to the new operating model when the second application is determined to be an extended applet and after the registration mechanism has determined that the second application does not use the legacy operating model for the SIO requested by the first application. In any event, if the second application is determined to be a servlet, the registry mechanism 104 invokes the SIO factory object (either 210-2 in FIG. 2) to cause an SIO to be created (step 450 of FIG. 4). If the second application is determined to be an extended applet operating in the new operating model, the registry mechanism 104 invokes the SIO factory object (210-3 in FIG. 3) to cause an SIO to be created (step 450 of FIG. 4). On the other hand, if the second application is determined to be an extended applet operating in the legacy model, the registry mechanism invokes a legacy method 110 such as "Applet.getShareableInterfaceObject( )" to obtain the SIO (step 430 of FIG. 4). Thereafter the registry mechanism 104 provides the SIO 108 to the first application 106 to enable it to communicate with the second application using the SIO from that point on (step 460 of FIG. 4).

In one embodiment, if a first application operates in the new operating model, it can send a request containing a SIO pattern that matches one or more SIO identifiers, rather than a SIO identifier, thereby avoiding hard-coding any specific SIO identifier as would be required in the legacy operating model. In one embodiment, this "wild card" mechanism is intended only for event SIOs and not for direct synchronous communications between applications. In such embodiment, the event SIOs are delivered asynchronously to the requesting application. For example, a first application may wish to view all critical events generated by other applications executing in different execution contexts on a smart card. The interested events in the other applications can be tagged as shareable interface objects and thus exposed to the first application for access. In one embodiment, SIO identifiers for those SIOs can be designated in such a way as containing a string "criticalEvent". The first application can thus send a request for all those SIOs with a SIO pattern containing "criticalEvent". Depending on a parameter settable in the request by the first application, all matched SIOs can be returned by the registration mechanism 104 to the first application or a subset of the matched SIOs can be returned by the registration mechanism 104. In the case of returning the subset, the registration mechanism may make selection based on a set of criteria given in the parameters in the request. Additionally or alternatively, the registration mechanism may make selection of the subset based on some user configurable policies. All variations of returning all or a subset of matched SIOs are within the scope of the present invention.

Since an application in the new operating model may use a pattern rather than a hard-coded identifier to address an SIO, upgrading of applications on the smart card is made less complex than before. An upgraded application can use a new SIO identifier even for a new SIO that replaced an old SIO as long as the new SIO identifier contains the same pattern as is known to its client applications and as long as the new SIO contains the equivalent data, methods and/or objects as are expected by its client applications.

In some embodiments, legacy applets and extended applets may be used to process requests that are in the form of Application Protocol Data Unit (APDU) from a hosting device for the smart card. Additionally, servlets extend the capability of smart cards from processing APDU requests to also processing web requests that are in the form of HyperText Transfer Protocol (HTTP) messages from any entity that can establish an internet connection with the smart card.

As noted, the registry mechanism 104 handles the request in a manner that is dependent on what type of application is requesting the SIO. For example, if the registry mechanism 104 determines that the requesting application is a legacy applet, which understands only the multi-step procedure, then the mechanism will provide the same requesting interface as would be expected by the legacy applet. Otherwise, if registry mechanism determines that the requesting application is a servlet or extended applet, which supports the new operating model, the registry mechanism provides a simpler procedure, which uses a factory object to create an SIO requested Since a registry mechanism 104 mediates between applications executing in different operating models as described, applications are freed from the direct responsibility of handling counterpart applications operating in different operating models as far as requesting for and serving a SIO is concerned. Thus, the programmatic complexity for both client and server applications is further reduced.

For the purpose of illustration, only two execution contexts are used to show how a client application in one execution context may request for a SIO from a server application in another execution context. However, this invention is not limited to only two execution contexts. In some embodiments, more than two execution contexts are involved. Furthermore, for the purpose of illustration, the first application 106 has been described as a client application that requests for a SIO. In some embodiments, the first application 106 may have its own SIOs to expose to its client applications in different execution context than the first execution context 102(1). Thus, the first application 106 (in FIGS. 1-3) can concurrently act as a server and a client application. Similarly, the second application 120 has been described as a server application that exposes a SIO. The present invention is not so limited. First, the second application 120 may have more than one SIO exposed to client applications. Second, the second application 120 may concurrently act as a client application that request for SIOs from applications in different execution contexts, in addition to being a server application to applications such as the first application. These and other variations of applications are within the scope of the present invention.

For the purpose of illustration, the registry entry for legacy SIOs contains a null field to indicate that the legacy SIOs are not associated with SIO factory objects. However, this invention is not limited to only using a null field for legacy SIOs. In some embodiments, the absence of any entry for legacy SIOs may be a practical implementation. The registry mechanism does not explicitly determine if a request for accessing an SIO comes from a client legacy applet by locating an entry in the SIO Registry. Rather, the determination is implicitly made by the fact that the client legacy applet only has access to the JCSystem.getShareableInterfaceObject( ) method. As for a request involving a server legacy applet, in differing embodiments, the JCRegistry.lookup( ) method under the new operating model may still be used. If the request is made by a client servlet or a client extended applet using the new operating model, the JCRegistry.lookup( ) method is directly invoked upon an initiation of such a request. If the request is made by a client legacy applet or a client extended servlet using the legacy operating model, the JCSystem.getShareableInterfaceObject( ) method is directly invoked. This JCSystem.getShareableInterfaceObject( ) method internally calls the JCRegistry.lookup( ) method to carry out detailed operations of obtaining the requested SIO from the server legacy applet. In any event, the JCRegistry.lookup( )method first looks up in the SIO Registry. Upon failure (since legacy applets are absent from the SIO Registry in this particular embodiment), the same method then checks if the provided identifier is a valid AID or is a URI that can be rewritten into a valid AID. The task of locating the server legacy applet is delegated to the system (or an applet container in one embodiment). The system (or the applet container) looks up the AID in its applet registry and calls the Applet.getShareableInterfaceObject( ) method. These and other variations of applications are within the scope of the present invention.

Registering and Un-registering SIOs

In one embodiment, applications operating in the new operating model such as servlets and extended applets may register and unregister their SIOs dynamically with the registration mechanism. A second application 120 operating in the new operating model can send a request to register a SIO factory object 210 for a SIO 108 as being associated with the second application 120, along with a set of identification information in the request for the SIO 108 and a reference for a SIO factory object 210 that can be invoked to create the SIO 108. Upon receiving the registration request, the registration mechanism 104 extracts a SIO identifier from the set of identification information and stores into the SIO lookup registry 112 an entry 114 comprising the SIO identifier 108 and the SIO factory object 210.

A second application operating in the new operating model can also send a request to un-register a SIO 108 along with a set of identification information in the request for the SIO 108. Upon receiving the un-registration request, the registration mechanism extracts a SIO identifier from the set of identification information, looks in the SIO lookup registry 112 for an entry 114 matching the identifier received and, if the matching entry 114 is found, removes the entry 114 from the SIO lookup registry.

In one embodiment, only an application which owns the SIO may register or un-register it.

Legacy applets have not been developed in a manner that can take advantage of the full capability of the registry mechanism and thus cannot make use of the dynamic registration and un-registration for their SIOs. In one embodiment, entries corresponding to SIOs in legacy applets are created when the application is installed based on information external to the application code such as a descriptor file and are removed when the application is uninstalled.

Hardware Overview

Figure 5:
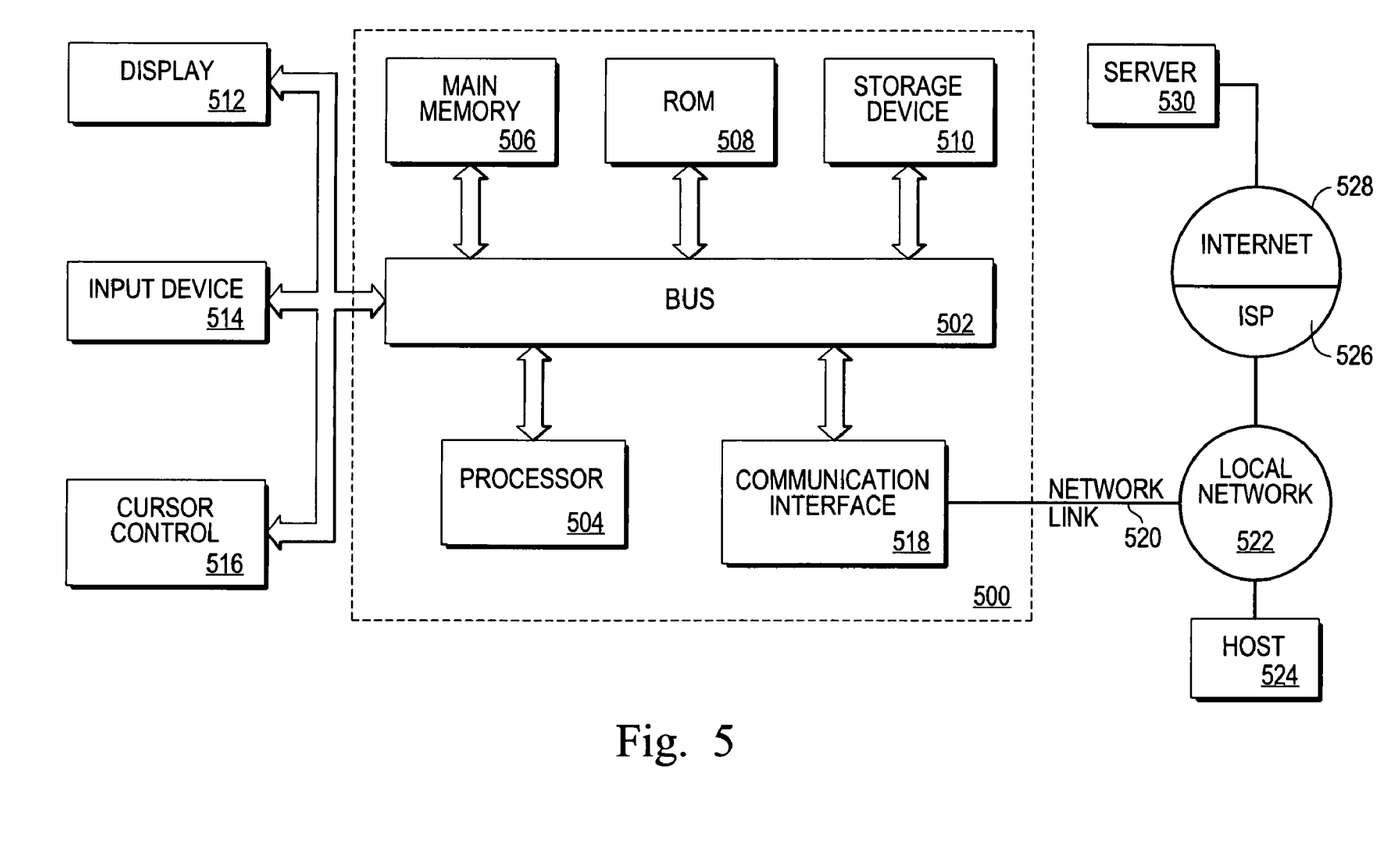
FIG. 5 is a block diagram of a general purpose computer system in which one embodiment of the present invention may be implemented.

In one embodiment, the registry mechanism takes the form of a set of instructions that are executed by one or more processors. FIG. 5 is a block diagram of a computer system 500 upon which an embodiment of the registry mechanism may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, and volatile media. Non-volatile media includes, for example, optical or magnetic disks, such as storage device 510. Volatile media includes dynamic memory, such as main memory 506.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. In a smart card system wherein applications executing in different execution contexts are allowed to communicate with each other only through sharable interface objects (SIO's), a method implemented by a smart card, comprising:

maintaining a SIO lookup registry comprising at least a first entry and a second entry, wherein the first entry comprises an universal resource identifier (URI) that is relative to a base URI enabling a particular application to be accessed as a web application, and that identifies a shareable interface object in the particular application, and the second entry comprises an application identifier that identifies another shareable interface object in another application, and wherein the first entry maps the particular application to a first factory object;

receiving, from a first application executing in a first execution context, a request to communicate with a second application executing in a second execution context, wherein the second application is executing on the smart card;

determining, using the first entry of the SIO lookup registry, whether the second application operates in accordance with a legacy operating model or a new model;

in response to a determination that the second application operates in accordance with a legacy operating model, invoking a legacy method of the second application to obtain a SIO therefrom;

in response to a determination that the second application operates in accordance with a new operating model, invoking the factory object associated with the second application to cause the SIO to be created; and providing the SIO to the first application to enable the first application to use the SIO to communicate with the second application.

2. The method of claim 1, wherein the second application operates in accordance with the new operating model, and wherein the method further comprises:

receiving a request to register the factory object as being associated with a second shareable interface object in the second application; and storing into the SIO lookup registry an entry indicating that the factory object is associated with the shareable interface object in the second application.

3. The method of claim 2, further comprising:

receiving a request to un-register the factory object as being associated with the second shareable interface object in the second application; and removing from the SIO lookup registry the entry indicating that the factory object is associated with the second shareable interface object in the second application.

4. The method of claim 1, wherein a second shareable interface object in the second application has an associate identifier, and wherein determining whether the second application operates in accordance with the legacy operating model or the new operating model comprises:

accessing the SIO lookup registry;

finding a matching entry in the SIO lookup registry that has a matching identifier that matches the associated identifier of the second shareable interface object;

determining whether the matching entry maps the matching identifier to the factory object;

in response to a determination that the matching identifier is not mapped to the factory object, concluding that the second application operates in accordance with the legacy operating model; and in response to a determination that the matching identifier is mapped to the factory object, concluding that the second application operates in accordance with the new operating model.

5. The method of claim 1, wherein the first application operates in accordance with the new operating model and the second application operates in accordance with the legacy operating model.

6. The method of claim 1, wherein the first application operates in accordance with the new operating model and the second application operates in accordance with the new operating model.

7. The method of claim 1, wherein the first application operates in accordance with the legacy operating model and the second application operates in accordance with the legacy operating model or the new operating model.

8. In a smart card system wherein applications executing in different execution contexts are allowed to communicate with each other only through shareable interface objects (SIO's), a machine readable storage medium, comprising:

instructions for causing one or more processors to receive, from a first application executing in a first execution context, a request to communicate with a second application executing in a second execution context, wherein the second application is executing on the smart card;

instructions for causing one or more processors to maintain a shareable interface object lookup registry comprising at least a first entry and a second entry, wherein the first entry comprises an universal resource identifier (URI) that is relative to a base URI enabling a particular application to be accessed as a web application, and that identifies a shareable interface object in the particular application, and the second entry comprises an application identifier that identifies another shareable interface object in another application, and wherein the first entry maps the particular application to a particular factory object;

instructions for causing one or more processors to determine, using the first entry of the shareable interface object lookup registry, whether the second application operates in accordance with a legacy operating model or a new model;

instructions for causing one or more processors to, in response to a determination that the second application operates in accordance with a legacy operating model, invoke a legacy method of the second application to obtain a SIO therefrom;

instructions for causing one or more processors to, in response to a determination that the second application operates in accordance with a new operating model, invoke the factory object associated with the second application to cause a SIO to be created; and instructions for causing one or more processors to provide the SIO to the first application to enable the first application to use the SIO to communicate with the second application.

9. The machine-readable storage medium of claim 8, wherein the second application operates in accordance with the new operating model, and wherein the medium further comprises:

instructions for causing one or more processors to receive a request to register the factory object as being associated with a second shareable interface object in the second application; and instructions for causing one or more processors to store into the SIO lookup registry an entry indicating that the factory object is associated with the second shareable interface object in the second application.

10. The machine-readable storage medium of claim 9, further comprising:

instructions for causing one or more processors to receive a request to un-register the factory object as being associated with the second shareable interface object in the second application; and instructions for causing one or more processors to removing from the SIO lookup registry the entry indicating that the factory object is associated with the second shareable interface object in the second application.

11. The machine-readable storage medium of claim 8, wherein a second shareable interface object in the second application has an associated identifier, and wherein the instructions for causing one or more processors to determine whether the second application operates in accordance with the legacy operating model or the new operating model comprise:

instructions for causing one or more processors to access the SIO lookup registry;

instructions for causing one or more processors to find a matching entry in the SIO lookup registry that has a matching identifier that matches the associated identifier of the second shareable interface object;

instructions for causing one or more processors to determine whether the matching entry maps the matching identifier to the factory object;

instructions for causing one or more processors to, in response to a determination that the matching identifier is not mapped to the factory object, conclude that the second application operates in accordance with the legacy operating model; and instructions for causing one or more processors to, in response to a determination that the matching identifier is mapped to the factory object, conclude that the second application operates in accordance with the new operating model.

12. The machine-readable storage medium of claim 8, wherein the first application operates in accordance with the new operating model and the second application operates in accordance with the legacy operating model.

13. The machine-readable storage medium of claim 8, wherein the first application operates in accordance with the new operating model and the second application operates in accordance with the new operating model.

14. The machine-readable storage medium of claim 8, wherein the first application operates in accordance with the legacy operating model and the second application operates in accordance with the legacy operating model or the new operating model.

15. An apparatus wherein applications executing in different execution contexts are allowed to communicated with each other only through shareable interface objects (SIO's), comprising:

one or more processors; and
   a machine readable storage medium, comprising:
   instructions for causing the one or more processors to receive, from a first application executing in a first execution context, a request to communicate with a second application executing in a second execution context, wherein the second application is executing on the smart card;
   instructions for causing the one or more processors to maintain a shareable interface object lookup registry comprising at least a first entry and a second entry, wherein the first entry comprises an universal resource identifier (URI) that is relative to a base URI enabling a particular application to be accessed as a web application, and that identifies a shareable interface object in the particular application, and the second entry comprises an application identifier that identifies another shareable interface object in another application, and wherein the first entry maps the particular application to a particular factory object;
   instructions for causing the one or more processors to determine, using the first entry of the shareable interface object lookup registry, whether the second application operates in accordance with a legacy operating model or a new model;
   instructions for causing the one or more processors to, in response to a determination that the second application operates in accordance with a legacy operating model, invoke a legacy method of the second application to obtain a SIO therefrom;
   instructions for causing the one or more processors to, in response to a determination that the second application operates in accordance with a new operating model, invoke the factory object associated with the second application to cause the SIO to be created; and
   instructions for causing the one or more processors to provide the SIO to the first application to enable the first application to use the SIO to communicate with the second application.

16. The apparatus of claim 15, wherein the second application operates in accordance with the new operating model, and wherein the machine readable storage medium further comprises:

instructions for causing the one or more processors to receive a request to register the factory object as being associated with a second shareable interface object in the second application; and
   instructions for causing the one or more processors to store into the SIO lookup registry an entry indicating that the factory object is associated with the shareable interface object in the second application.

\* \* \* \* \*

UNITED STATES PATENT AND TRADEMARK OFFICE
CERTIFICATE OF CORRECTION

| | | |
|---|---|---|
| PATENT NO. | : 7,836,456 B1 | Page 1 of 1 |
| APPLICATION NO. | : 11/590953 | |
| DATED | : November 16, 2010 | |
| INVENTOR(S) | : Thierry P. Violleau | |

It is certified that error appears in the above-identified patent and that said Letters Patent is hereby corrected as shown below:

Under "Other Publications" on Page 2, "European Patent Office, "European Search Report", European application No. 06256576.7-221, 11 pages" should read as "European application "European Patent Office, "European Search Report", European application No. 06256576.7-2212", received January 3, 2008, 11 pages.

Signed and Sealed this

Eighteenth Day of January, 2011

David J. Kappos
*Director of the United States Patent and Trademark Office*